(12) United States Patent
Yang et al.

(10) Patent No.: US 11,936,990 B2
(45) Date of Patent: Mar. 19, 2024

(54) PHOTOGRAPHING METHOD FOR ADJUSTING TRANSPARENCY OF LCD PANEL BASED ON IMAGE COLLECTION STORAGE MEDIUM, AND ELECTRONIC DEVICE

(71) Applicant: JRD COMMUNICATION (SHENZHEN) LTD., Guangdong (CN)

(72) Inventors: Bo Yang, Guangdong (CN); Guangyue Luo, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 0 days.

(21) Appl. No.: 17/906,069

(22) PCT Filed: Mar. 30, 2020

(86) PCT No.: PCT/CN2020/082062
§ 371 (c)(1),
(2) Date: Sep. 10, 2022

(87) PCT Pub. No.: WO2021/179358
PCT Pub. Date: Sep. 16, 2021

(65) Prior Publication Data
US 2023/0114910 A1    Apr. 13, 2023

(30) Foreign Application Priority Data

Mar. 10, 2020 (CN) .......................... 202010161092.7

(51) Int. Cl.
*H04N 23/741* (2023.01)
*G02F 1/133* (2006.01)
(Continued)

(52) U.S. Cl.
CPC ....... *H04N 23/741* (2023.01); *G02F 1/13306* (2013.01); *H04N 23/71* (2023.01);
(Continued)

(58) Field of Classification Search
CPC ...... H04N 23/741; H04N 23/71; H04N 23/73; G02F 1/13306; G02F 1/15;
(Continued)

(56) References Cited

U.S. PATENT DOCUMENTS 9,497,385 B2 * 11/2016 Horii ...................... H04N 23/00
10,180,615 B2 * 1/2019 Kilgore .................. H04N 23/55
(Continued)

FOREIGN PATENT DOCUMENTS

CN        102568386 A      7/2012
CN        103515397 A      1/2014
(Continued)

OTHER PUBLICATIONS

Written Opinion of the International Search Authority in international application No. PCT/CN2020/082062, dated Dec. 9, 2020.
(Continued)

*Primary Examiner* — Ahmed A Berhan
(74) *Attorney, Agent, or Firm* — PV IP PC; Wei Te Chung; Zhigang Ma (57) ABSTRACT

A photographing method, a storage medium, and an electronic device (100). The electronic device (100) comprises a display screen (21) and a camera module (22), and the display screen (21) comprises a liquid crystal panel (211), a backlight module (212), and electrochromic glass (213) which are stacked. When an HDR image needs to be captured, image acquisition is performed on a current scene by means of the camera module (22), an acquired image is analyzed, then the light transmittance of the liquid crystal panel (211) is adjusted according to brightness distribution information, and finally, secondary image acquisition is performed by means of the camera module (22) to obtain a target image.

20 Claims, 5 Drawing Sheets

(51) Int. Cl.
　　　*H04N 23/71*　　(2023.01)
　　　*H04N 23/73*　　(2023.01)
　　　*G02F 1/15*　　(2019.01)

(52) U.S. Cl.
　　　CPC .............. *H04N 23/73* (2023.01); *G02F 1/15* (2013.01); *G02F 2203/01* (2013.01)

(58) Field of Classification Search
　　　CPC .. G02F 2203/01; G02F 1/157; G02F 2203/48; G02F 1/1333; G03B 30/00; H04M 1/0266; H04M 2250/52
　　　See application file for complete search history.

(56) References Cited

U.S. PATENT DOCUMENTS

2002/0154379 A1* 10/2002 Tonar ................. B60R 1/088
　　　　　　　　　　　　　　　　　　　　　　257/E33.059
2003/0122951 A1　7/2003　Hara et al.
2018/0120661 A1　5/2018　Kilgore et al.

FOREIGN PATENT DOCUMENTS

| | | |
|---|---|---|
| CN | 104349068 A | 2/2015 |
| CN | 107786785 A | 3/2018 |
| CN | 109154736 A | 1/2019 |
| CN | 110266848 A | 9/2019 |
| CN | 110581910 A | 12/2019 |
| CN | 110581958 A | 12/2019 |
| CN | 110646962 A | 1/2020 |

OTHER PUBLICATIONS

International Search Report in International application No. PCT/CN2020/082062, dated Dec. 9, 2020.
1st Office Action issued in corresponding Chinese Patent Application No. 202010161092.7, dated Dec. 16, 2020, pp. 1-11.

* cited by examiner

PHOTOGRAPHING METHOD FOR ADJUSTING TRANSPARENCY OF LCD PANEL BASED ON IMAGE COLLECTION STORAGE MEDIUM, AND ELECTRONIC DEVICE

CROSS REFERENCE

This application is a US national phase application based upon an International Application No. PCT/CN2020/082062, filed on Mar. 30, 2020, which claims the priority of Chinese Patent Application No. 202010161092.7, entitled "PHOTOGRAPHING METHOD, STORAGE MEDIUM, AND ELECTRONIC DEVICE," filed on Mar. 10, 2020, the disclosures of which are incorporated herein by reference in its entirety.

FIELD OF THE DISCLOSURE

The present disclosure relates to an electronic device, and more particularly, to a photographing method, a photographing device, a storage medium and a related electronic device.

BACKGROUND

High dynamic range (HDR) images show us a new world of infinite possibilities. The HDR images could show all viewable dynamic range of the real world and are mainly used in videos, special effects, 3D effects or some other high-end pictures. HDR images could proportionally show and store all luminance values in the real scene. By using this function, an almost real blurred and clear effect could be generated.

However, in a conventional HDR image photographing process, multiple exposures need to be performed and generate multiple images and these images are synthesized to generate one HRD image. In this way, the power consumption of the electronic device is higher.

SUMMARY

Technical Problem

One objective of an embodiment of the present disclosure is to provide a photographing method, a photographing device, a storage medium and a related electronic device to reduce the power consumption.

Technical Solution

According to a first aspect of the present disclosure, a photographing method used in an electronic device is disclosed. The electronic device comprises a display screen and a camera module. The display screen comprises a liquid crystal display (LCD) panel, a backlight module and an electrochromic glass. The LCD panel comprises a display region configured to display information. The backlight module has an opening, positioned in the display region and on a light emitting path of the camera module. The electrochromic glass is located at one side of the LCD panel facing the backlight module. An orthogonal projection of the electrochromic glass on the backlight module covers the opening. The electrochromic glass is controlled to be transparent when the camera module is working such that an external light orderly passes through the LCD panel, the opening, and the transparent electrochromic glass to enter a light incident surface of the camera module. The photographing method includes: performing a first image collection on a current scene through the camera module to obtain a reference image, analyzing the reference image to obtain a luminance distribution information of the reference image, adjusting a transparency of the LCD panel according to the luminance distribution information of the reference image, and performing a second image collection on the current scene through the camera module to obtain a target image.

According to a second aspect of the present disclosure, a computer readable storage medium used in an electronic device is disclosed. The electronic device comprises a display screen and a camera module. The display screen comprises a liquid crystal display (LCD) panel, a backlight module and an electrochromic glass. The LCD panel comprises a display region configured to display information. The backlight module has an opening, positioned in the display region and on a light emitting path of the camera module. The electrochromic glass is located at one side of the LCD panel facing the backlight module. An orthogonal projection of the electrochromic glass on the backlight module covers the opening. The electrochromic glass is controlled to be transparent when the camera module is working such that an external light orderly passes through the LCD panel, the opening, and the transparent electrochromic glass to enter a light incident surface of the camera module. The computer readable storage medium stores a plurality of instructions executable by a processor to perform operations. The operations include: performing a first image collection on a current scene through the camera module to obtain a reference image, analyzing the reference image to obtain a luminance distribution information of the reference image, adjusting a transparency of the LCD panel according to the luminance distribution information of the reference image, and performing a second image collection on the current scene through the camera module to obtain a target image.

According to a third aspect of the present disclosure, an electronic device is disclosed. The electronic device comprises a storage device and a processor. The processor is electrically connected to the storage device. The storage device is configured to store instructions and data. The processor is configured to execute the instructions to perform the above-mentioned photographing method. The electronic device comprises a display screen and a camera module. The display screen comprises a liquid crystal display (LCD) panel, a backlight module and an electrochromic glass. The LCD panel comprises a display region configured to display information. The backlight module has an opening, positioned in the display region and on a light emitting path of the camera module. The electrochromic glass is located at one side of the LCD panel facing the backlight module. An orthogonal projection of the electrochromic glass on the backlight module covers the opening. The electrochromic glass is controlled to be transparent when the camera module is working such that an external light orderly passes through the LCD panel, the opening, and the transparent electrochromic glass to enter a light incident surface of the camera module. The computer readable storage medium stores a plurality of instructions executable by a processor to perform operations. The operations include: performing a first image collection on a current scene through the camera module to obtain a reference image, analyzing the reference image to obtain a luminance distribution information of the reference image, adjusting a transparency of the LCD panel according to the luminance distribution information of the reference image, and performing a second image collection on the current scene through the camera module to obtain a target image.

Advantageous Effect

Embodiments of the present disclosure are directed to a photographing method, a photographing device, a storage medium and a related electronic device to reduce the power consumption.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachablely connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

According to an embodiment of the present disclosure, an electronic device is provided. The electronic device could be a smart phone, a tablet, or any other devices. Please refer to FIG. 1. The electronic device 100 comprises a cover plate 10, a display screen module 20, a circuit board 30 and a shell 40.

Figure 1:
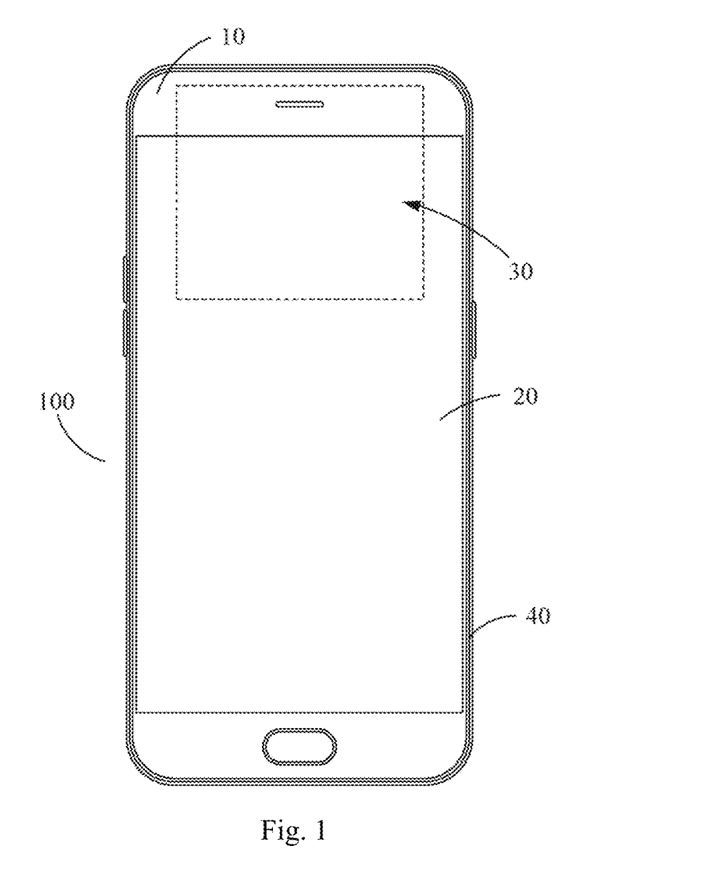
FIG. 1 is a diagram of an electronic device according to an embodiment of the present disclosure.

The cover plate 10 is stalled on the display screen module 20 to cover the display screen module 20. The cover plate 10 could be a transparent glass cover plate 10. In some embodiments, the cover plate 10 could be a glass cover plate 10 made with sapphire.

The display screen module 20 is installed on the shell 40 to form the display surface of the electronic device 100. The display module 20 is regarded as a front shell of the electronic device 100 and form a closed space with the shell 40 to place other electronic components of the electronic device 100. Furthermore, the display module 20 forms the display surface of the electronic device to display images or texts.

The circuit board 30 is installed inside the shell 40 such that the circuit board 30 is placed inside the aforementioned closed space. The circuit board could be a main board of the electronic device 100. The circuit board 30 has a ground node to connect the circuit board 30 to the ground. The circuit board 30 could integrate the functional components, such as a camera, a sensor, and a processor. In addition, the display module 20 could be electrically connected to the circuit board 30.

In some embodiments, the circuit board 30 has a display control circuit. The display control circuit outputs an electric signal to the display screen module 20 to control the display screen module 20 to display information.

The shell 40 is configured to form the appearance of the electronic device 100. The material of the shell 40 could be made with plastic or metal. The shell 40 could be integrally formed.

Furthermore, the shell 40 could be formed by a single component or multiple components. As is shown, the shell 40 could comprise side walls and a back side connected to the side walls. The shell 40 could be manufactured with at least one of the plastic material, the ceramic material, and the metal material. In some embodiments, an LCD panel 211 could be placed inside the shell 40.

Figure 2:
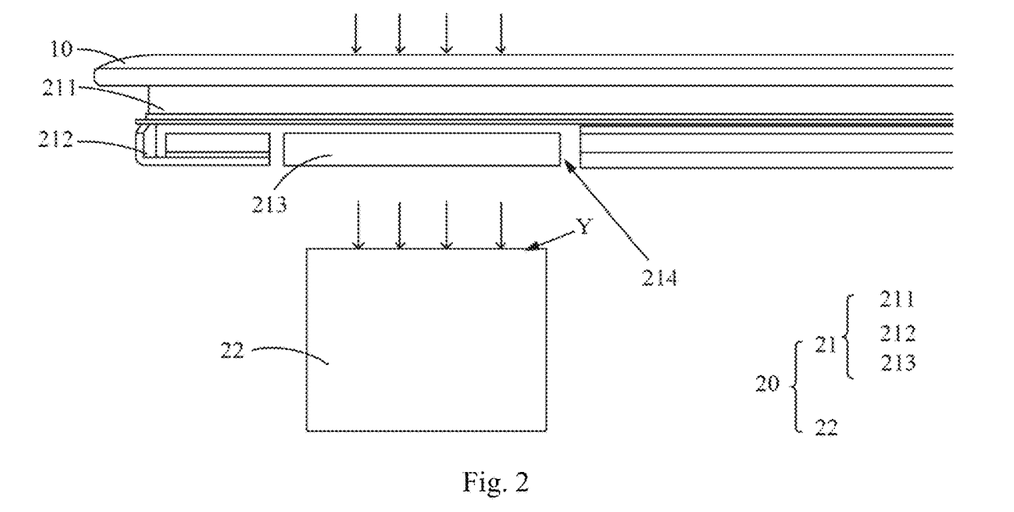
FIG. 2 is a diagram of a display screen module according to an embodiment of the present disclosure.

As shown in FIG. 2, the display screen module 20 comprises a display screen 21 and a camera module 22. Here, the display screen 21 comprises orderly-stacked a liquid crystal display (LCD) panel 211, a backlight module 212 and an electrochromic module 213. The LCD panel 211 comprises orderly-stacked an upper polarizer, a color filter, liquid crystals, thin film transistors (TFTs), and a lower polarizer. The LCD panel 211 is configured to display images or texts. The backlight module 212 is configured to provide a light source for the LCD panel 211 to display information.

The LCD panel 21 comprises a display region and a non-display region. Here, the display region is configured to perform the display function of the LCD panel 211. That is, the display region is configured to display information. The non-display region does not display information. The LCD panel 211 could comprise a plurality of non-display regions isolated with each other. For example, please refer to FIG. 1 again. The non-display regions 215 could be placed at the top and the bottom of the LCD panel 211. The non-display regions 215 could be used to place functional components, such as a microphone or a fingerprint module.

The LCD panel 211 does not generate light and is lighten by the underneath backlight module 212. The backlight module 212 could be formed by a light source, a light guiding plate, a light reflector and an optical film. When the light generated by the backlight module 212 reaches the LCD panel 211, the light passes through the lower polarizer of the LCD panel 211. Here, different LCD panels 211 changes the polarization direction of the light according to their mechanisms. Then, the light passes through the color filter to generate the color and then is incident to the upper polarizer. After the liquid crystals rotate to a specific direction, a part of the light could pass through the LC layer and a part of the light is absorbed by the LC layer. In this way, each pixel of the LCD panel 211 could have a specific amplitude of the emitted light and thus an image could be shown.

Please refer to FIG. 2. The backlight module 212 has an opening 214. The opening 214 is correspondingly positioned in the display region 211 and on a light emitting path of the camera module 22. The opening 214 allows the light signal or the audio signal to pass through. The electrochromic module 213 is located at one side of the LCD panel 212 facing the backlight module 212. The orthogonal projection of the electrochromic module 213 onto the backlight module 212 covers the opening 214. That is, the electrochromic module 213 is also placed on the light emitting path of the camera module 22. It should be noted that the electrochromic module 213 at least comprises an electrochromic glass, which could be controlled by a control voltage to transit between a transparent state and an atomization state.

Figure 4:
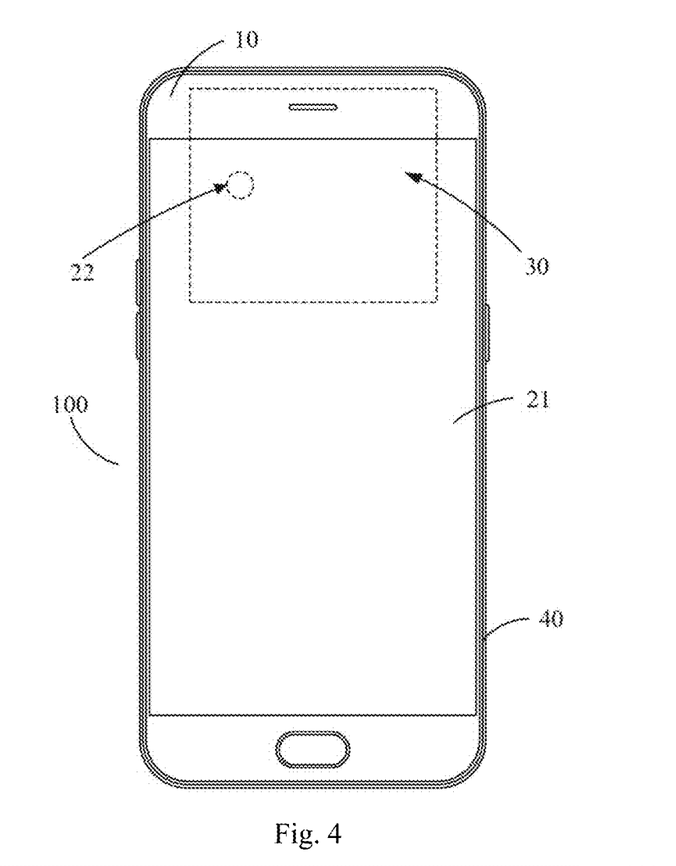
FIG. 4 is another diagram of an electronic device according to an embodiment of the present disclosure.

Please refer to FIG. 4. The camera module 22 could be placed in the display region of the display screen 21 such that the electronic device 100 does not need to open an opening on an additional non-display region for placing the camera module 22. This could also hind the camera module 22 and raise the screen-to-body ratio of the electronic device 100. The camera module 22 could be placed at a side of the display screen 21 having the electrochromic module 213 and connected to the circuit board 30.

Figure 3:
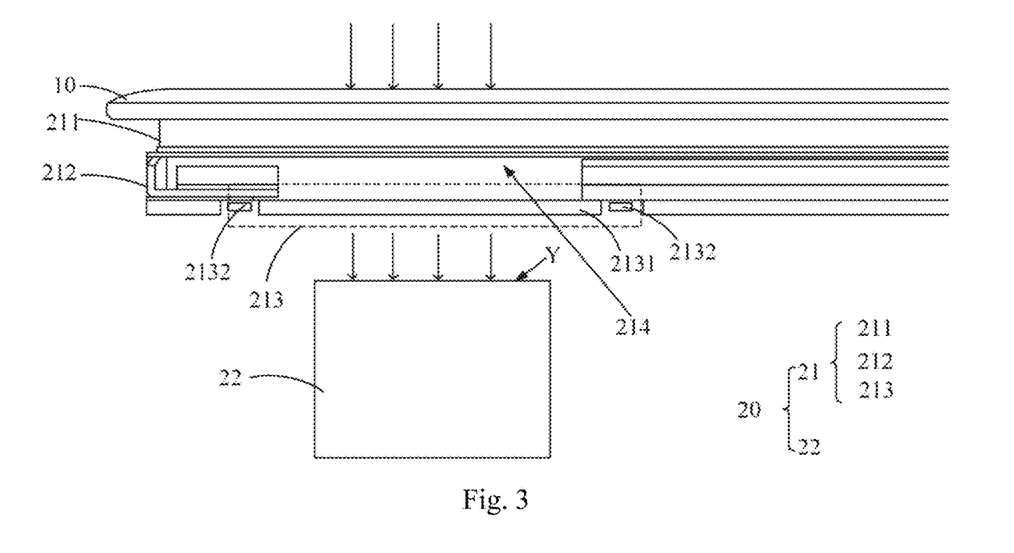
FIG. 3 is a diagram of the display screen of the display screen components according to an embodiment of the present disclosure.

Please refer to FIG. 3. The electrochromic module 213 could comprise an electrochromic layer 2131 and light sources 2132 placed at two ends of the electrochromic layer 2131. In the actual implementation, the electrochromic layer 2131 could be an electrochromic glass. The light sources 2132 could be light emitting diodes (LEDs). When the camera module 22 is working, the electrochromic glass could be controlled to be transparent by a control voltage such that an external light could orderly pass through the LCD panel 211, the opening 214, and the transparent electrochromic layer 2131 to enter a light incident surface of the camera module 22. When the camera module 22 stops working, the electrochromic layer 2131 is controlled to be atomized by a control voltage such that the light entering the atomized electrochromic layer 2131 is refracted to be a backlight source at the opening 214.

Please refer to FIG. 2. The electrochromic module 213 needs to be placed on the light emitting path of the camera such that the light emitted from the camera module 22 or the light incident to the electronic device 100 could be controlled by adjusting the transparency of the electrochromic module 213.

A plurality of fixed members are set at the edge of the opening 214. The electrochromic module 213 can be fixed with the backlight module 212 through the fixed members. In the actual implementation, the fixed members could be a part of the backlight module 212. By snap fitting the electrochromic module 213 with the backlight module 212, the electrochromic module 213 can be fixed with the backlight module 212 to form a whole body.

In addition, a fixed bracket could be installed on the circuit board 30 or the backlight module 212. Through the fixed bracket, the electrochromic module 213 can be fixed on the light emitting path of the camera module 22.

The opening 214 is a round hole. In some embodiments, the opening 214 could be a square hole or an oval hole. Correspondingly, the electrochromic glass in the electrochromic module 213 could be in a shape of round, square, or oval.

Figure 5:
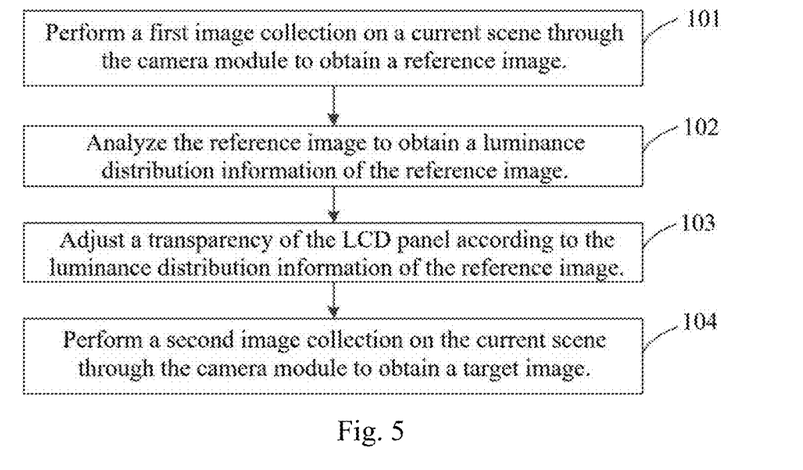
FIG. 5 is a flow chart of a photographing method according to an embodiment of the present disclosure.

According to an embodiment of the present disclosure, a photographing method is disclosed. The photographing method is used in the above-mentioned electronic device. Please refer to FIG. 5. The photographing method comprises:

Step 101: performing a first image collection on a current scene through the camera module to obtain a reference image.

Figure 6:
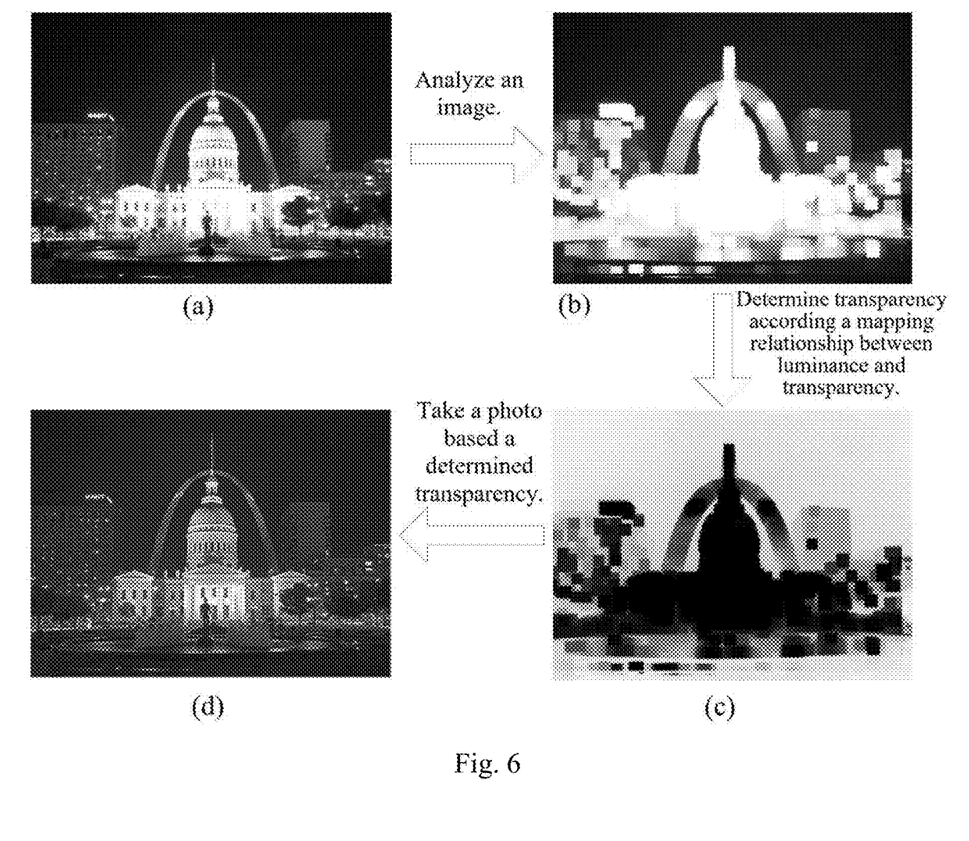
FIG. 6 shows an application scene for the photographing method according to an embodiment of the present disclosure.

The camera module in the electronic device is used to take a photo of the current scene according to a default photographing parameter to obtain a normally-exposed image as the reference image (as shown in (a) of FIG. 6). Here, the photographing parameter comprises a shutter value, an aperture value, an ISO value, and/or an EV value.

Step 102: analyzing the reference image to obtain a luminance distribution information of the reference image.

The luminance of each pixel in the reference image is detected using HSV (Hue Saturation Value) space. For example, HSV is a color space model of an intuitive character of the color. In this model, the color parameter comprises hue (H), saturation (S) and luminance (V). Here, the luminance (V) is ranged between 0 (black)-255 (white). If the reference image is in an RGB format, the RGB format is transformed into the HSV format to obtain the V component. The V component is the luminance component.

In the actual implementation, the V component of each pixel could be corresponding to the position of each pixel such that the luminance distribution information could be represented by a luminance distribution picture (as shown in (b) of FIG. 6).

Step 103: adjusting a transparency of the LCD panel according to the luminance distribution information of the reference image.

In this embodiment, the LCD panel has an adjustable transparency. Therefore, the transparency of the LCD panel is adjusted according to the luminance distribution information.

Figure 7:
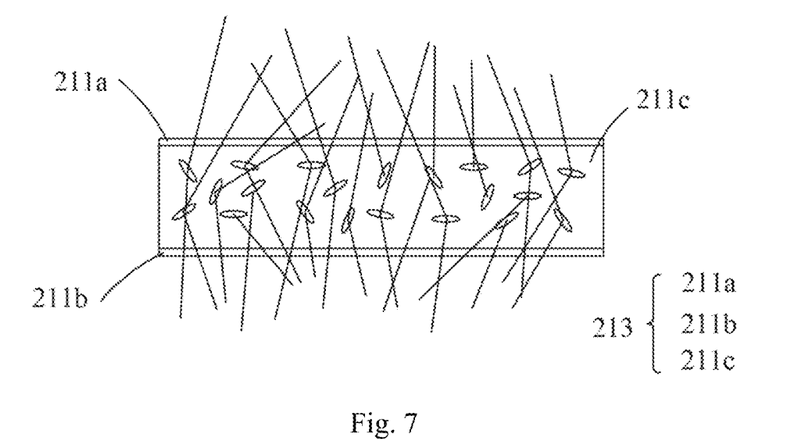
FIG. 7 shows a state of an LCD panel according to an embodiment of the present disclosure.
Figure 8:
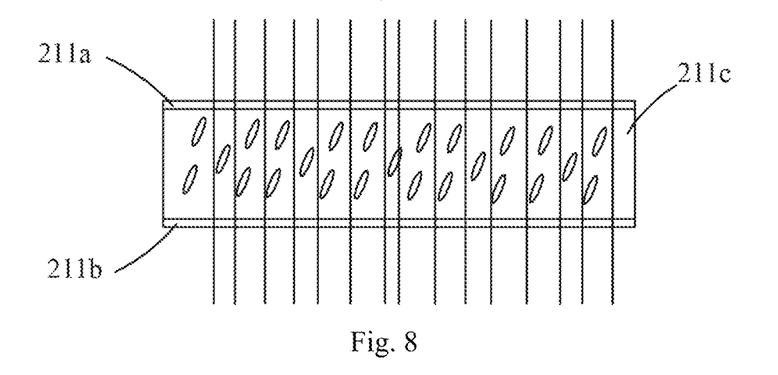
FIG. 8 shows another state of an LCD panel according to an embodiment of the present disclosure.

Please refer to FIG. 7 and FIG. 8. The LCD panel could comprise transparent upper-layer substrate 211a, an LC layer 211c and a transparent lower-layer substrate 211b. The upper-layer substrate 211a, the LC layer 211c and the lower-layer substrate 211b are orderly stacked. In the actual implementation, the upper-layer substrate 211a and the lower-layer substrate 211b could be manufactured with a conductive ITO material.

When the camera module is working, the LC molecules in the LC layer 213 are driven to be orderly arranged such that the LCD panel becomes a transparent region having a certain transparency. In this way, the external light could orderly pass through the LCD panel, the opening and the electrochromic module to enter the light incident surface of the camera module.

As shown in FIG. 8, when the camera module is activated to work, the voltages could be applied to the upper-layer substrate 211a and the lower-layer substrate 211b to drive the LC molecules to be orderly arranged such that the light could vertically enter the light incident surface of the camera module through the light guiding component.

The luminance distribution information could comprise the luminance value of each of the pixel in the reference image. The Step 103 comprises:
Step (11): determining a position point of the LCD panel to which each pixel is projected such that a mapping relationship between a pixel point and the position point is obtained.
Step (12): adjusting the transparency of the LCD panel according to the luminance of each pixel and the mapping relationship.
In some embodiments, the LCD panel comprises a plurality of transparent regions. The Step (12) comprises:

Step (211): determining at least one reference position point in each of the transparent regions to obtain a position set corresponding to each of the transparent regions.
Step (212): determining a corresponding transparency adjusting parameter according to the position set and the mapping relationship.
Step (213): adjusting a transparency of a transparent region according to the transparency adjusting parameter corresponding to the transparent region.

Specifically, the transparency distribution picture (shown as (c) of FIG. 6) of the LCD panel could be depicted/simulated by related algorithm according to the mapping relationship between the pixel and the position point in combination with the luminance of each pixel. And then, based on the obtained transparency distribution picture, the transparency adjusting parameter corresponding to each position point could be calculated. And then, the transparency of a transparent region is adjusted according to the transparency adjusting parameter corresponding to the transparent region. In the actual implementation, the transparency of each position point could decrease as the increase of the luminance value of the position point decreases. Please refer to FIG. 6 again. The black color represents a low transparency and the white color represents a high transparency.

In some embodiments, the step of determining the corresponding transparency adjusting parameter according to the position set and the mapping relationship comprises: determining a position layout of each reference position point in a corresponding transparent region; determining a weight information corresponding to each reference position point according to the position layout; obtaining a luminance corresponding of each reference position point in the position set; performing a weighting operation on the luminance corresponding to each reference position point to obtain a target luminance value; and processing the target luminance value according to a predetermined rule to obtain the corresponding transparency adjusting parameter.

In the actual implementation, in order to meet the HRD image effect, a higher exposure should be adopted for a darker part and a lower exposure should be adopted for a brighter part. Therefore, the transparency is set to increase as the decrease of the target luminance value. Here, the transparency adjusting parameter could be the rotation angle of the LC molecules in the LC layer.

In some embodiments, the Step 103 could comprise following steps:
Step (22): determining an electrical parameter corresponding to the luminance distribution information.
Step (23): applying a corresponding voltage on the transparent upper layer substrate and the transparent lower layer substrate according to the electrical parameter to drive liquid crystal molecules in the liquid crystal layer to rotate such that the transparency is adjusted.

Here, the electrical parameter could be a voltage value or a current value. In the actual implementation, the required exposure of each pixel could be determined according to the actual luminance of each pixel and the difference between the luminance value of each pixel in the luminance distribution information and the luminance values of surrounding pixels. And then, the required transparency of the position point of the LCD panel corresponding to the pixel is determined according to the required exposure. And then, the required electrical parameter is determined according to the predetermined corresponding relationship between the transparency and the electrical parameter. Finally, the corresponding voltage is applied to the upper-layer substrate and the lower-layer substrate based on the electrical parameter to drive the LC molecules in the LC layer to rotate such that the transparent is adjusted.

Step 104: performing a second image collection on the current scene through the camera module to obtain a target image.

In some embodiments, the Step 104 could comprise:

Step (31): determining a target region in the current scene having a luminance lower than a predetermined value.

Step (32): determining an exposure parameter according to the luminance of the target region.

Step (33): performing the second image collection on the current scene through the camera module according to the exposure parameter to obtain the target image.

Specifically, the target region in the current scene having a luminance lower than the predetermined value (the dark region) is determined according to the luminance distribution information. And then, the exposure parameter is determined according to the actual luminance of the target region and the camera module is driven based on the exposure parameter to perform the second image collection on the current scene to obtain the target image. In the actual implementation, the exposure parameter could be adjusted (increasing ISO and exposure time) appropriately for the dark region and the photographing result is the HDR image (shown as (d) in FIG. 6).

From the above, a photographing method is disclosed according to an embodiment. Through forming an opening on the backlight module and placing an electrochromic glass at the opening and on the light emitting path of the camera module, when the camera module is working, the electrochromic glass is controlled to be transparent such that an external light orderly passes through the LCD panel, the opening, and the transparent electrochromic glass to enter a light incident surface of the camera module. When the HDR image needs to be obtained, an first image collection is performed on a current scene through the camera module, then the collected image is analyzed to obtain the luminance distribution information of the reference image, then the transparency of the LCD panel is adjusted according to the luminance distribution information of the reference image, and then a second image collection is performed on the current scene through the camera module to obtain a target image. This solution could reduce the power consumption of the electronic device by reducing the number of exposures for obtaining the HDR image. In addition, it only needs to photograph the current scene to obtain the HDR image after adjusting the transparency of the LCD panel without synthesizing multiple exposed images to obtain the HDR image. This could reduce the image processing complexity.

In another embodiment, a photographing device is disclosed. The photographing device could be integrated in an electronic device in a form of hardware or software. The electronic device could be the above-mentioned electronic device. For example, the electronic device could comprise a display screen and a camera module. The display screen comprises stacked a liquid crystal display (LCD) panel, a backlight module and an electrochromic glass. The LCD panel comprises a display region configured to display information. The backlight module has an opening, positioned in the display region and on the light emitting path of the camera module. The electrochromic glass is located at one side of the LCD panel facing the backlight module and the orthogonal projection of the electrochromic glass on the backlight module covers the opening. The electrochromic glass is controlled to be transparent when the camera module is working such that an external light orderly passes through the LCD panel, the opening, and the transparent electrochromic glass to enter the light incident surface of the camera module. Please refer to FIG. 9, the photographing device 300 could comprise: a first collection unit 301, an analyzing unit 302, an adjusting unit 303 and a second collection unit 304.

Figure 9:
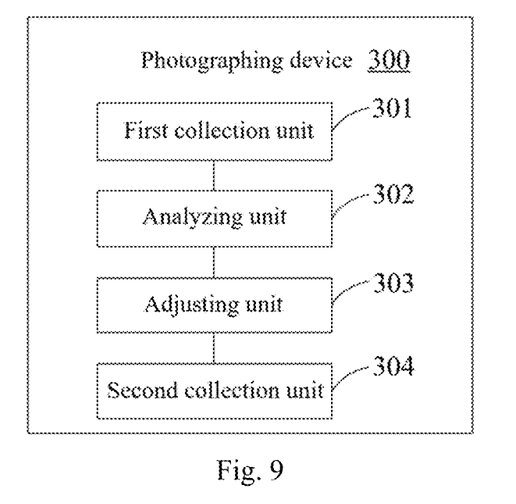
FIG. 9 is a diagram of a photographing device according to an embodiment of the present disclosure.

The first collection unit 301 is configured to perform a first image collection on a current scene through the camera module to obtain a reference image.

The analyzing unit 302 is configured to analyze the reference image to obtain a luminance distribution information of the reference image.

The adjusting unit 303 is configured to adjust a transparency of the LCD panel according to the luminance distribution information of the reference image.

The second collection unit 304 is configured to perform a second image collection on the current scene through the camera module to obtain a target image.

In some embodiments, the luminance distribution information comprises the luminance value of each pixel in the reference image. The adjusting unit 303 could be further configured to determine a position point of the LCD panel to which each pixel is projected such that a mapping relationship between a pixel point and the position point is obtained; and adjust the transparency of the LCD panel according to the luminance of each pixel and the mapping relationship.

In some embodiments, the LCD panel comprises a plurality of transparent regions. When the transparency of the LCD panel is being adjusted according to the luminance of each pixel and the mapping relationship, the adjusting unit 303 is further configured to determine at least one reference position point in each of the transparent regions to obtain a position set corresponding to each of the transparent regions; determine a corresponding transparency adjusting parameter according to the position set and the mapping relationship; and adjust a transparency of a transparent region according to the transparency adjusting parameter corresponding to the transparent region.

In some embodiments, when the corresponding transparency adjusting parameter is being determined according to the position set and the mapping relationship, the adjusting unit 303 is further configured to determine a position layout of each reference position point in a corresponding transparent region; determine a weight information corresponding to each reference position point according to the position layout; obtain a luminance corresponding of each reference position point in the position set; perform a weighting operation on the luminance corresponding to each reference position point to obtain a target luminance value; and process the target luminance value according to a predetermined rule to obtain the corresponding transparency adjusting parameter.

In some embodiments, the transparency increases as the target luminance value decreases.

In some embodiments, the LCD panel comprises a transparent upper-layer substrate, an LC layer and a transparent lower-layer substrate. The transparent upper-layer substrate, the LC layer and the transparent lower-layer substrate are orderly stacked. When the transparency of the LCD panel is being adjusted according to the luminance distribution information, the adjusting unit is further configured to determine an electrical parameter corresponding to the luminance distribution information; and apply a corresponding voltage on the transparent upper layer substrate and the transparent lower layer substrate according to the electrical parameter to drive liquid crystal molecules in the liquid crystal layer to rotate such that the transparency is adjusted.

In some embodiments, the second collection unit could be further configured to determine a target region in the current scene having a luminance lower than a predetermined value; determine an exposure parameter according to the luminance of the target region; and perform the second image collection on the current scene through the camera module according to the exposure parameter to obtain the target image.

In an embodiment, a computer readable storage medium used in an electronic device is disclosed. The computer readable storage medium storing a plurality of instructions, configured to be executed by a processor to perform the above-mentioned photographing method in any of the above embodiments.

In an embodiment, an electronic device is disclosed. The electronic device comprises a display screen, a camera module, a processor and a storage device. The processor is electrically connected to the display screen, the camera module and the storage device. The display screen comprises stacked a liquid crystal display (LCD) panel, a backlight module and an electrochromic glass. The LCD panel comprises a display region configured to display information. The backlight module has an opening, positioned in the display region and on a light emitting path of the camera module. The electrochromic glass is located at one side of the LCD panel facing the backlight module, and an orthogonal projection of the electrochromic glass on the backlight module covers the opening. The storage device stores instructions and data. The processor is configured to execute the instructions to perform the above-mentioned photographing method in any of the above embodiments.

From the above, a photographing method and a photographing device are disclosed according to an embodiment. Through forming an opening on the backlight module and placing an electrochromic glass at the opening and on the light emitting path of the camera module, when the camera module is working, the electrochromic glass is controlled to be transparent such that an external light orderly passes through the LCD panel, the opening, and the transparent electrochromic glass to enter a light incident surface of the camera module. When the HDR image needs to be obtained, an first image collection is performed on a current scene through the camera module, then the collected image is analyzed to obtain the luminance distribution information of the reference image, then the transparency of the LCD panel is adjusted according to the luminance distribution information of the reference image, and then a second image collection is performed on the current scene through the camera module to obtain a target image. This solution could reduce the power consumption of the electronic device by reducing the number of exposures for obtaining the HDR image. In addition, it only needs to photograph the current scene to obtain the HDR image after adjusting the transparency of the LCD panel without synthesizing multiple exposed images to obtain the HDR image. This could reduce the image processing complexity.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A photographing method, used in an electronic device, the electronic device comprising a display screen and a camera module; the display screen comprising a liquid crystal display (LCD) panel, a backlight module and an electrochromic glass; the LCD panel comprising a display region configured to display information; the backlight module having an opening, positioned in the display region and on a light emitting path of the camera module; the electrochromic glass located at one side of the LCD panel facing the backlight module and an orthogonal projection of the electrochromic glass on the backlight module covering the opening; the electrochromic glass controlled to be transparent when the camera module is working such that an external light orderly passes through the LCD panel, the opening, and the transparent electrochromic glass to enter a light incident surface of the camera module, and the photographing method comprising:
    performing a first image collection on a current scene through the camera module to obtain a reference image;
    analyzing the reference image to obtain a luminance distribution information of the reference image;
    adjusting a transparency of the LCD panel according to the luminance distribution information of the reference image; and
    performing a second image collection on the current scene through the camera module to obtain a target image.

2. The photographing method of claim 1, wherein the luminance distribution information comprises a luminance value of each pixel in the reference image, and the step of adjusting the transparency of the LCD panel according to the luminance distribution information comprises:
    determining a position point of the LCD panel to which each pixel is projected such that a mapping relationship between a pixel point and the position point is obtained; and
    adjusting the transparency of the LCD panel according to the luminance of each pixel and the mapping relationship.

3. The photographing method of claim 2, wherein the LCD panel comprises a plurality of transparent regions and the step of adjusting the transparency of the LCD panel according to the luminance of each pixel and the mapping relationship comprises:
    determining at least one reference position point in each of the transparent regions to obtain a position set corresponding to each of the transparent regions;
    determining a corresponding transparency adjusting parameter according to the position set and the mapping relationship; and
    adjusting a transparency of a transparent region according to the transparency adjusting parameter corresponding to the transparent region.

4. The photographing method of claim 3, wherein a step of determining the corresponding transparency adjusting parameter according to the position set and the mapping relationship comprises:
    determining a position layout of each reference position point in a corresponding transparent region;
    determining a weight information corresponding to each reference position point according to the position layout;
    obtaining a luminance corresponding of each reference position point in the position set;
    performing a weighting operation on the luminance corresponding to each reference position point to obtain a target luminance value; and
    processing the target luminance value according to a predetermined rule to obtain the corresponding transparency adjusting parameter.

5. The photographing method of claim 4, wherein the transparency increases as the target luminance value decreases.

6. The photographing method of claim 1, wherein the LCD panel comprises a transparent upper layer substrate, a liquid crystal layer and a transparent lower layer substrate; the transparent upper layer substrate, the liquid crystal layer and the transparent lower layer substrate are orderly stacked; and a step of adjusting the transparency of the LCD panel according to the luminance distribution information of the reference image comprises:
  determining an electrical parameter corresponding to the luminance distribution information; and
  applying a corresponding voltage on the transparent upper layer substrate and the transparent lower layer substrate according to the electrical parameter to drive liquid crystal molecules in the liquid crystal layer to rotate such that the transparency is adjusted.

7. The photographing method of claim 1, wherein a step of performing the second image collection on the current scene through the camera module to obtain the target image comprises:
  determining a target region in the current scene having a luminance lower than a predetermined value;
  determining an exposure parameter according to the luminance of the target region; and
  performing the second image collection on the current scene through the camera module according to the exposure parameter to obtain the target image.

8. A non-transitory computer readable storage medium, used in an electronic device, the electronic device comprising a display screen and a camera module; the display screen comprising a liquid crystal display (LCD) panel, a backlight module and an electrochromic glass; the LCD panel comprising a display region configured to display information; the backlight module having an opening, positioned in the display region and on a light emitting path of the camera module; the electrochromic glass located at one side of the LCD panel facing the backlight module and an orthogonal projection of the electrochromic glass on the backlight module covering the opening; the electrochromic glass controlled to be transparent when the camera module is working such that an external light orderly passes through the LCD panel, the opening, and the transparent electrochromic glass to enter a light incident surface of the camera module; the non-transitory computer readable storage medium storing a plurality of instructions executable by a processor to perform operations comprising:
  performing a first image collection on a current scene through the camera module to obtain a reference image;
  analyzing the reference image to obtain a luminance distribution information of the reference image;
  adjusting a transparency of the LCD panel according to the luminance distribution information of the reference image; and
  performing a second image collection on the current scene through the camera module to obtain a target image.

9. The non-transitory computer readable storage medium of claim 8, wherein the luminance distribution information comprises a luminance value of each pixel in the reference image, and the operation of adjusting the transparency of the LCD panel according to the luminance distribution information comprises:
  determining a position point of the LCD panel to which each pixel is projected such that a mapping relationship between a pixel point and the position point is obtained; and
  adjusting the transparency of the LCD panel according to the luminance of each pixel and the mapping relationship.

10. The non-transitory computer readable storage medium of claim 9, wherein the LCD panel comprises a plurality of transparent regions and the operation of adjusting the transparency of the LCD panel according to the luminance of each pixel and the mapping relationship comprises:
  determining at least one reference position point in each of the transparent regions to obtain a position set corresponding to each of the transparent regions;
  determining a corresponding transparency adjusting parameter according to the position set and the mapping relationship; and
  adjusting a transparency of a transparent region according to the transparency adjusting parameter corresponding to the transparent region.

11. The non-transitory computer readable storage medium of claim 10, wherein the operation of determining the corresponding transparency adjusting parameter according to the position set and the mapping relationship comprises:
  determining a position layout of each reference position point in a corresponding transparent region;
  determining a weight information corresponding to each reference position point according to the position layout;
  obtaining a luminance corresponding of each reference position point in the position set;
  performing a weighting operation on the luminance corresponding to each reference position point to obtain a target luminance value; and
  processing the target luminance value according to a predetermined rule to obtain the corresponding transparency adjusting parameter.

12. The non-transitory computer readable storage medium of claim 11, wherein the transparency increases as the target luminance value decreases.

13. The non-transitory computer readable storage medium of claim 8, wherein the LCD panel comprises a transparent upper layer substrate, a liquid crystal layer and a transparent lower layer substrate; the transparent upper layer substrate, the liquid crystal layer and the transparent lower layer substrate are orderly stacked; and the operation of adjusting the transparency of the LCD panel according to the luminance distribution information of the reference image comprises:
  determining an electrical parameter corresponding to the luminance distribution information; and
  applying a corresponding voltage on the transparent upper layer substrate and the transparent lower layer substrate according to the electrical parameter to drive liquid crystal molecules in the liquid crystal layer to rotate such that the transparency is adjusted.

14. The non-transitory computer readable storage medium of claim 8, wherein the operation of performing the second image collection on the current scene through the camera module to obtain the target image comprises:
  determining a target region in the current scene having a luminance lower than a predetermined value;
  determining an exposure parameter according to the luminance of the target region; and
  performing the second image collection on the current scene through the camera module according to the exposure parameter to obtain the target image.

15. An electronic device, comprising a display screen, a camera module, a processor and a storage device;

wherein the processor is electrically connected to the display screen, the camera module and the storage device;

wherein the display screen comprises a liquid crystal display (LCD) panel, a backlight module and an electrochromic glass, the LCD panel comprises a display region configured to display information, the backlight module has an opening, positioned in the display region and on a light emitting path of the camera module, the electrochromic glass is located at one side of the LCD panel facing the backlight module, and an orthogonal projection of the electrochromic glass on the backlight module covers the opening; and wherein the storage device stores instructions and data, and the processor is configured to execute the instructions to perform operations comprising:

performing a first image collection on a current scene through the camera module to obtain a reference image;

analyzing the reference image to obtain a luminance distribution information of the reference image;

adjusting a transparency of the LCD panel according to the luminance distribution information of the reference image; and performing a second image collection on the current scene through the camera module to obtain a target image.

16. The electronic device of claim 15, wherein the luminance distribution information comprises a luminance value of each pixel in the reference image, and the operation of adjusting the transparency of the LCD panel according to the luminance distribution information comprises:

determining a position point of the LCD panel to which each pixel is projected such that a mapping relationship between a pixel point and the position point is obtained; and adjusting the transparency of the LCD panel according to the luminance of each pixel and the mapping relationship.

17. The electronic device of claim 16, wherein the LCD panel comprises a plurality of transparent regions and the operation of adjusting the transparency of the LCD panel according to the luminance of each pixel and the mapping relationship comprises:

determining at least one reference position point in each of the transparent regions to obtain a position set corresponding to each of the transparent regions;

determining a corresponding transparency adjusting parameter according to the position set and the mapping relationship; and adjusting a transparency of a transparent region according to the transparency adjusting parameter corresponding to the transparent region.

18. The electronic device of claim 17, wherein an operation of determining the corresponding transparency adjusting parameter according to the position set and the mapping relationship comprises:

determining a position layout of each reference position point in a corresponding transparent region;

determining a weight information corresponding to each reference position point according to the position layout;

obtaining a luminance corresponding of each reference position point in the position set;

performing a weighting operation on the luminance corresponding to each reference position point to obtain a target luminance value; and processing the target luminance value according to a predetermined rule to obtain the corresponding transparency adjusting parameter.

19. The electronic device of claim 15, wherein the LCD panel comprises a transparent upper layer substrate, a liquid crystal layer and a transparent lower layer substrate; the transparent upper layer substrate, the liquid crystal layer and the transparent lower layer substrate are orderly stacked; and the operation of adjusting the transparency of the LCD panel according to the luminance distribution information of the reference image comprises:

determining an electrical parameter corresponding to the luminance distribution information; and applying a corresponding voltage on the transparent upper layer substrate and the transparent lower layer substrate according to the electrical parameter to drive liquid crystal molecules in the liquid crystal layer to rotate such that the transparency is adjusted.

20. The electronic device of claim 15, wherein the operation of performing the second image collection on the current scene through the camera module to obtain the target image comprises:

determining a target region in the current scene having a luminance lower than a predetermined value;

determining an exposure parameter according to the luminance of the target region; and performing the second image collection on the current scene through the camera module according to the exposure parameter to obtain the target image.

\* \* \* \* \*